United States Patent
Lee et al.

(10) Patent No.: US 11,299,133 B2
(45) Date of Patent: Apr. 12, 2022

(54) SYSTEM FOR PRE-PREVENTING INSTABILITY OF VEHICLE BY REGENERATIVE BRAKING OF REAR WHEEL

(71) Applicants: Hyundai Motor Company, Seoul (KR); Kia Motors Corporation, Seoul (KR)

(72) Inventors: Joung-Hee Lee, Hwaseong-si (KR); Ung-Hee Shin, Yeosu-si (KR); Jae-Hun Shim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 75 days.

(21) Appl. No.: 17/025,206

(22) Filed: Sep. 18, 2020

(65) Prior Publication Data

US 2021/0394727 A1   Dec. 23, 2021

(30) Foreign Application Priority Data

Jun. 19, 2020   (KR) .................. 10-2020-0074873

(51) Int. Cl.
```
G06F 7/70      (2006.01)
B60T 8/1755    (2006.01)
B60T 8/171     (2006.01)
B60L 3/10      (2006.01)
```

(52) U.S. Cl.
CPC .......... *B60T 8/17551* (2013.01); *B60L 3/108* (2013.01); *B60T 8/171* (2013.01); *B60T 8/17552* (2013.01); *B60T 2230/02* (2013.01); *B60T 2270/311* (2013.01); *B60T 2270/613* (2013.01)

(58) Field of Classification Search
CPC .. B60T 8/17551; B60T 8/171; B60T 8/17552; B60T 2230/02; B60T 2270/311; B60T 2270/613; B60L 3/108; G06F 7/70
USPC .......................................................... 701/70
See application file for complete search history.

(56) References Cited

U.S. PATENT DOCUMENTS

| | | | |
|---|---|---|---|
| 2014/0121870 A1* | 5/2014 | Lee ...................... | B60W 30/16 701/22 |
| 2016/0368384 A1* | 12/2016 | Johansson ............... | B60L 3/102 |
| 2017/0021731 A1* | 1/2017 | Suzuki .................. | B60T 8/1755 |

FOREIGN PATENT DOCUMENTS

KR   10-2019-0136353 A   12/2019

* cited by examiner

*Primary Examiner* — Shardul D Patel
(74) *Attorney, Agent, or Firm* — Morgan, Lewis & Bockius LLP (57) ABSTRACT

A system and a method for preventing instability of a vehicle due to regenerative braking of a rear, may include a first controller configured of distributing braking torque of front and rear wheels for a deceleration level according to a basic regenerative braking distribution ratio on a regenerative brake map on the basis of a driver demand braking amount, and configured of previously reducing a rear-wheel regenerative braking torque of the rear wheel to a first reference value or less than the first reference value in an adjustment section between first and second deceleration; and a second controller connected to the first controller and configured of further reducing the rear-wheel regenerative braking torque to transmit it to the first controller, if a wheel slip value is greater than a reference slip value according to vehicle driving information during braking of the vehicle.

19 Claims, 11 Drawing Sheets

SYSTEM FOR PRE-PREVENTING INSTABILITY OF VEHICLE BY REGENERATIVE BRAKING OF REAR WHEEL

CROSS-REFERENCE TO RELATED APPLICATION

The present application claims priority to Korean Patent Application No. 10-2020-0074873, filed on Jun. 19, 2020, the entire contents of which is incorporated herein for all purposes by this reference.

BACKGROUND OF THE INVENTION

Field of the Invention

The present invention relates to a system for pre-preventing instability of a vehicle due to regenerative braking of a rear wheel. More particularly, the invention relates to a system and a method for preventing instability of a vehicle due to regenerative braking of a rear wheel of the vehicle, which previously reduce a regenerative braking amount before a rear wheel slips, thus securing the stability of a vehicle, and updating a regenerative brake map according to a braking situation.

Description of Related Art

A vehicle driven using an electric motor, namely, an electric vehicle (EV) or a hybrid electric vehicle (HEV), an eco-friendly vehicle such as a fuel cell vehicle (FCV) perform regenerative braking when the vehicle is braked.

A regenerative braking system of the eco-friendly vehicle converts the kinetic energy of the vehicle into electrical energy while the vehicle is braking, stores the energy in a battery, and reuses the energy to drive the electric motor when the vehicle is driving, thus improving the fuel efficiency of the vehicle.

The eco-friendly vehicle is provided with a hydraulic braking system that generates braking force by hydraulic pressure. This may not obtain sufficient braking effects only with regenerative braking force. Furthermore, since the regenerative braking force is generated only in a driving wheel connected to the motor, the desirable control of the vehicle behavior may not be achieved by braking only the driving wheel.

Therefore, to satisfy driver demand braking force while regenerative braking is performed in the vehicle, it is necessary to appropriately distribute the regenerative braking force generated in a driving motor and the hydraulic braking force generated in a brake.

Meanwhile, the regenerative braking control of the vehicle that performs the regenerative braking in the rear wheel is different from that of the conventional vehicle that performs the regenerative braking in only the front wheel. A green vehicle performing the regenerative braking in only the front wheel has the driving motor in the front wheel. When the driving motor charges the battery to recover energy, the regenerative braking force is generated, and the present braking force acts on only the front wheel. Even if the total braking force of the front wheel is large due to the regenerative braking force of the front wheel, there is a low possibility that the vehicle spins. Thus, to recover energy as much as possible, the generated amount of the regenerative braking force may be maximized. However, in the case of a vehicle performing the regenerative braking in the rear wheel of the vehicle, when the rear-wheel regenerative braking force is increased to recover a lot of energy, the rear wheel is locked prior to the front wheel, so that there is a high possibility that the vehicle spins, and thereby there is a limit to increasing the regenerative braking force.

Meanwhile, to prevent the wheel from slipping according to the road conditions when the running vehicle is braked, various technologies for controlling the regenerative braking torque are disclosed. As the related art, if the wheel slip is detected while control is made to generate first coasting torque in a motor providing driving force to a wheel, the motor is controlled to generate second coasting torque which is lower than the first coasting torque.

Figure 1:
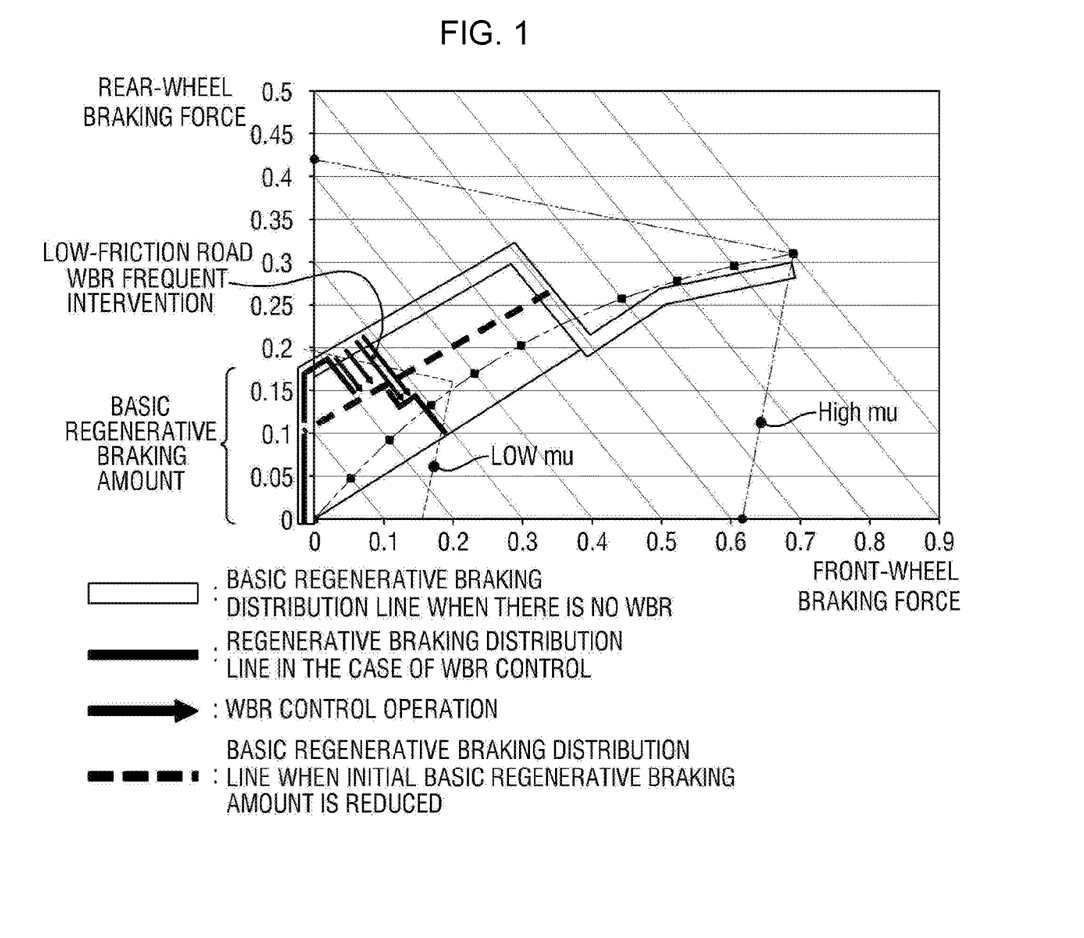
FIG. 1 is a brake diagram illustrating the frequent intervention of a second controller.

However, when a related art of brake system and control method thereof is applied to the rear-wheel drive regenerative braking vehicle, it is difficult to rapidly cope with the rear-wheel slip because the control is made of after the rear wheel slips. Furthermore, as illustrated in FIG. 1, the rear wheel first reaches a friction limit on a low-friction road, and consequently the control is frequently performed, thus leading to different braking feelings.

To solve the problems, a method of reducing a basic regenerative braking amount may be used, but is disadvantageous in terms of the fuel efficiency of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a novel type of system, in which braking torque of front and rear wheels is distributed according to a regenerative brake map, rear-wheel regenerative braking torque is previously reduced in a predetermined deceleration section, thus preventing the rear wheel from slipping, and the regenerative brake map is updated to be suitable for the stability or fuel efficiency of a vehicle in consideration of the control of a reduction in rear-wheel regenerative braking torque intervening after a wheel slip occurs.

According to one aspect of the present invention, various aspects of the present invention are directed to providing a system including a first controller configured of distributing braking torque of a front wheel and a rear wheel for a deceleration level according to a basic regenerative braking distribution ratio on a regenerative brake map on the basis of a driver demand braking amount, and configured of previously reducing a rear-wheel regenerative braking torque of the rear wheel to a first reference value or less than the first reference value in an adjustment section between a first deceleration and a second deceleration; and a second controller connected to the first controller and configured of further reducing the rear-wheel regenerative braking torque to transmit the reduced torque to the first controller, if a rear-wheel slip value generated in the rear wheel is greater than a reference slip value according to vehicle driving information during braking of the vehicle. Here, the first controller may adjust the rear-wheel regenerative braking torque of the adjustment section or rear-wheel hydraulic braking torque depending on an intervention degree of the second controller, thus updating the regenerative brake map.

According to various exemplary embodiments of the present invention, the following effects are achieved.

First, it is possible to secure the stability of a vehicle by previously reducing a rear-wheel regenerative braking torque before a rear wheel slips, and it is unnecessary to reduce basic regenerative braking torque, so that it is possible to improve the fuel efficiency of a vehicle.

Second, the control of a reduction in rear-wheel regenerative braking torque does not intervene frequently, so that different braking feelings and Noise, vibration, harshness (NVH) may be minimized when driving.

Third, a regenerative brake map may be updated in consideration of an intervention to control a reduction in rear-wheel regenerative braking torque or an intervention frequency by monitoring whether a rear wheel slips or not in real time, thus further minimizing different braking feelings according to a braking situation.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of a system for pre-preventing instability of a vehicle by regenerative braking of a rear wheel in accordance with various aspects of the present invention will be described in detail with reference to the appended drawings. Furthermore, the terminologies or words used in the description and claims of the present invention may not be interpreted as being limited merely to common or dictionary meanings. On the other hand, they may be interpreted based on the meanings and concepts of the present invention in keeping with the scope of the present invention on the basis of the principle that the inventor(s) can appropriately define the concepts of terms to describe the present invention in the best way.

Figure 2:
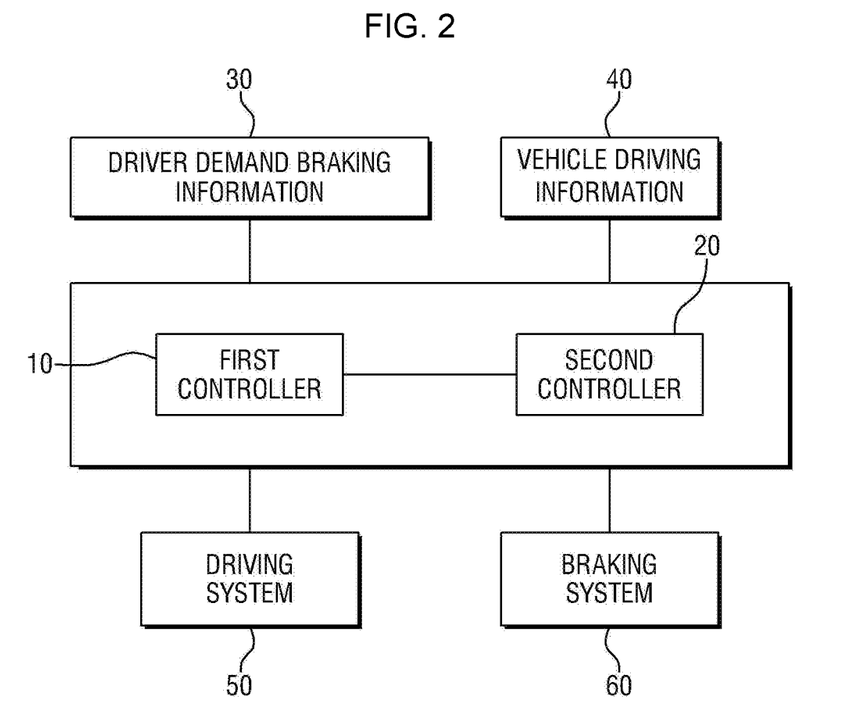
FIG. 2 is a diagram schematically illustrating the configuration of a system in accordance with various exemplary embodiments of the present invention.
Figure 3A:
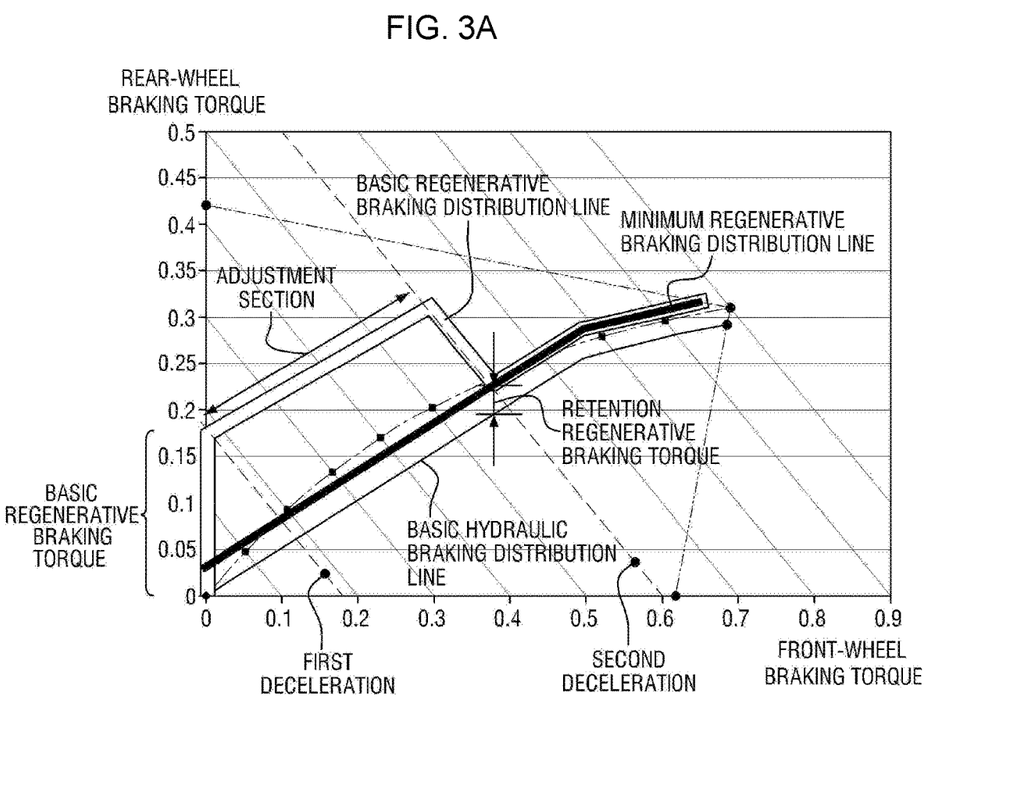
FIG. 3A and FIG. 3B are brake diagrams illustrating states before and after a regenerative brake map is applied.
Figure 3B:
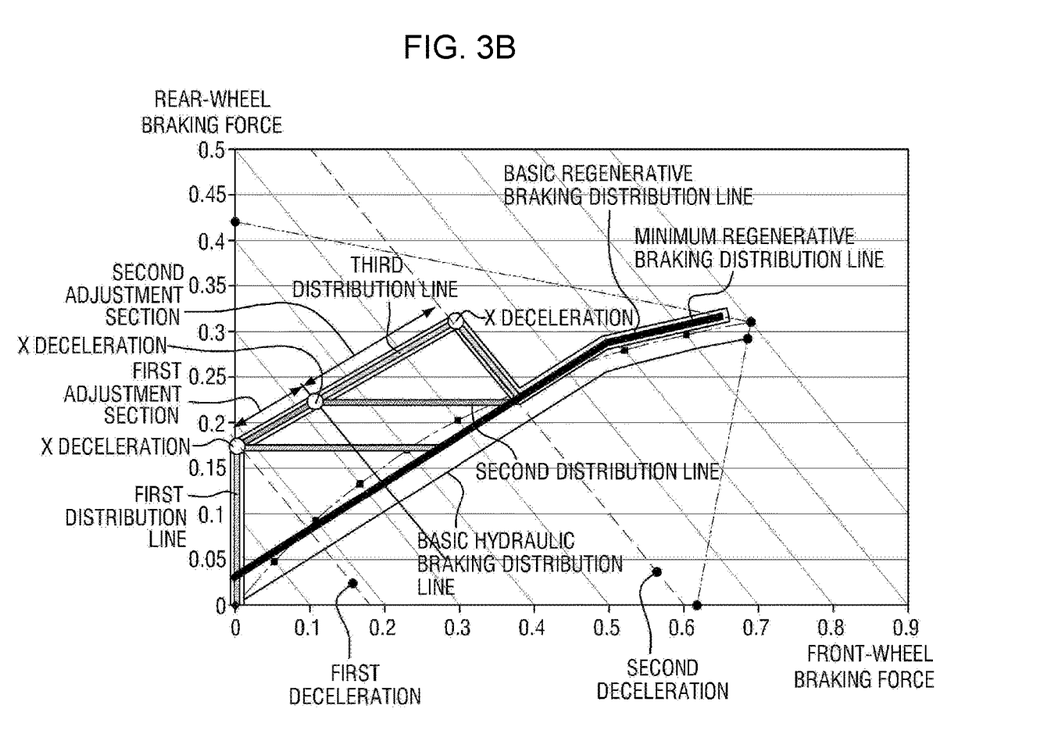

FIG. 2 is a diagram schematically illustrating the configuration of a system in accordance with various exemplary embodiments of the present invention, and FIG. 3A and FIG. 3B are brake diagrams illustrating states before and after a regenerative brake map is applied.

Referring to FIG. 2, a system for preventing instability of a vehicle due to regenerative braking of a rear wheel in accordance with various exemplary embodiments of the present invention includes a first controller 10 and a second controller 20.

The first controller 10 controls to perform braking according to a preset regenerative brake map (RBM). The regenerative brake map is a brake diagram of distributing the braking torque (or braking force) of a front wheel or a rear wheel depending on a deceleration level on the basis of a driver demand braking amount 30, and is configured to adjust regenerative braking torque of the rear wheel.

Herein, expression "front-wheel braking torque" means front-wheel hydraulic braking torque, and expression "rear-wheel braking torque" means the sum of rear-wheel regenerative braking torque and rear-wheel hydraulic braking torque. Here, the rear-wheel regenerative braking torque includes rear-wheel coast regenerative braking torque.

The brake diagrams of FIG. 3A and FIG. 3B show a state where the front-wheel braking torque (x-axis) and the rear-wheel braking torque (y-axis) are distributed depending on the deceleration level. In the brake diagrams of FIG. 3A and FIG. 3B, a portion shown by a diagonal line represents uniform deceleration, and various distribution lines distributing the braking torque of the front and rear wheels are shown. Here, the basic regenerative braking distribution line represents a distribution relationship between the front-wheel hydraulic braking torque and the rear-wheel braking torque, the basic hydraulic braking distribution line represents a distribution relationship between the front-wheel hydraulic braking torque and the rear-wheel hydraulic braking torque, and a minimum regenerative braking distribution line represents a distribution relationship between the front-wheel hydraulic braking torque, the rear-wheel coast regenerative braking torque, and the rear-wheel hydraulic braking torque.

In the brake diagrams of FIG. 3A and FIG. 3B, the first deceleration and the second deceleration may be set. The first deceleration may be set to deceleration when the basic regenerative braking torque is applied to only the rear wheel before the hydraulic braking torque (of the front and rear wheels) intervenes. The basic regenerative braking torque may be determined at a level where the wheel slip does not occur excessively when only the rear-wheel regenerative braking torque is applied. In this regard, expression "the level where the wheel slip does not occur excessively" may mean a level of about 15% or less for a total wheel slip rate. The second deceleration may be determined at a level where only minimum retention regenerative braking torque remains by reducing the rear-wheel regenerative braking torque at a level where the rear wheel is not locked prior to the front wheel on a high-friction road. The retention regenerative braking torque may be set to any value, but is equal to the rear-wheel coast regenerative braking torque in various exemplary embodiments of the present invention. Here, the rear-wheel coast regenerative braking torque is regenerative torque according to a vehicle speed during coasting.

Referring to FIG. 3A, in a state where the rear-wheel regenerative brake map is not applied, the braking torque of the front and rear wheels is distributed along a basic regenerative braking distribution line. The basic regenerative braking torque is generated in a section from initial braking deceleration to first deceleration. In a section from the first deceleration to the second deceleration, the front-wheel hydraulic braking torque, the rear-wheel regenerative braking torque, and the rear-wheel hydraulic braking torque are generated. To secure the stability of the vehicle after the second deceleration, the braking torque of the front and rear wheels is distributed along the minimum regenerative braking distribution line. Here, a difference corresponding to the retention regenerative braking torque occurs between the basic hydraulic braking distribution line and the minimum regenerative braking distribution line.

As illustrated in FIG. 3A, unless the regenerative brake map is set, excessive braking torque may occur in the rear wheel of the vehicle, so that the wheel slip may occur due to the previous lock of the rear wheel. To solve the problem, a method of reducing the basic regenerative braking torque may be considered, but is disadvantageous in terms of the fuel efficiency of the vehicle. Therefore, in various exemplary embodiments of the present invention, the control of the regenerative brake map that previously reduces the rear-wheel regenerative braking torque in a section (hereinafter referred to as an 'adjustment section') between the first deceleration and the second deceleration is performed.

Referring to FIG. 3B, X deceleration is set between adjustment sections, so that the first adjustment section and the second adjustment section appear. Since the rear-wheel regenerative braking torque as well as the rear-wheel hydraulic braking torque may be generated in the first adjustment section, the rear-wheel braking torque may be increased, but the rear-wheel regenerative braking torque is formed to be equal to or less than a preset first reference value. The rear-wheel regenerative braking torque is reduced, and simultaneously the rear-wheel hydraulic braking torque is increased in the second adjustment section. However, the rear-wheel braking torque is formed to be equal to or less than a second reference value. The first reference value and the second reference value will be described below.

After the second adjustment section, the braking torque of the front and rear wheels is distributed along the minimum regenerative braking distribution line.

Meanwhile, referring to FIG. 3B, the X deceleration may move along the basic regenerative braking distribution line in the adjustment section. In other words, the lower limit value of the X deceleration is first deceleration, and the upper limit value thereof is second deceleration. First to third distribution lines appear according to the position of the X deceleration. The regenerative brake map having the first distribution line is a brake map that reduces the rear-wheel regenerative braking torque and is formed in consideration of the stability of the vehicle, and the regenerative brake map having the third distribution line is a brake map that increases the rear-wheel regenerative braking torque and is formed in consideration of the fuel efficiency of the vehicle.

The first controller 10 sets any one of the regenerative brake maps having the first to third distribution lines to the basic regenerative brake map, and controls to distribute the braking torque of the front and rear wheels according to the basic regenerative brake map. In the instant case, since the basic regenerative braking torque does not need to be reduced in the regenerative brake map, this is advantageous in terms of the fuel efficiency of the vehicle.

The first controller 10 controls to update the regenerative brake maps having the first to third distribution lines. For example, if the regenerative brake map having the second distribution line is the basic regenerative brake map, the first controller 10 controls to change the position of the X deceleration in consideration of the braking situation and update the regenerative brake map of a vehicle stability mode or a vehicle fuel-efficiency mode. Here, the updated regenerative brake map is applied to a next braking operation after braking is completed.

Figure 4A:
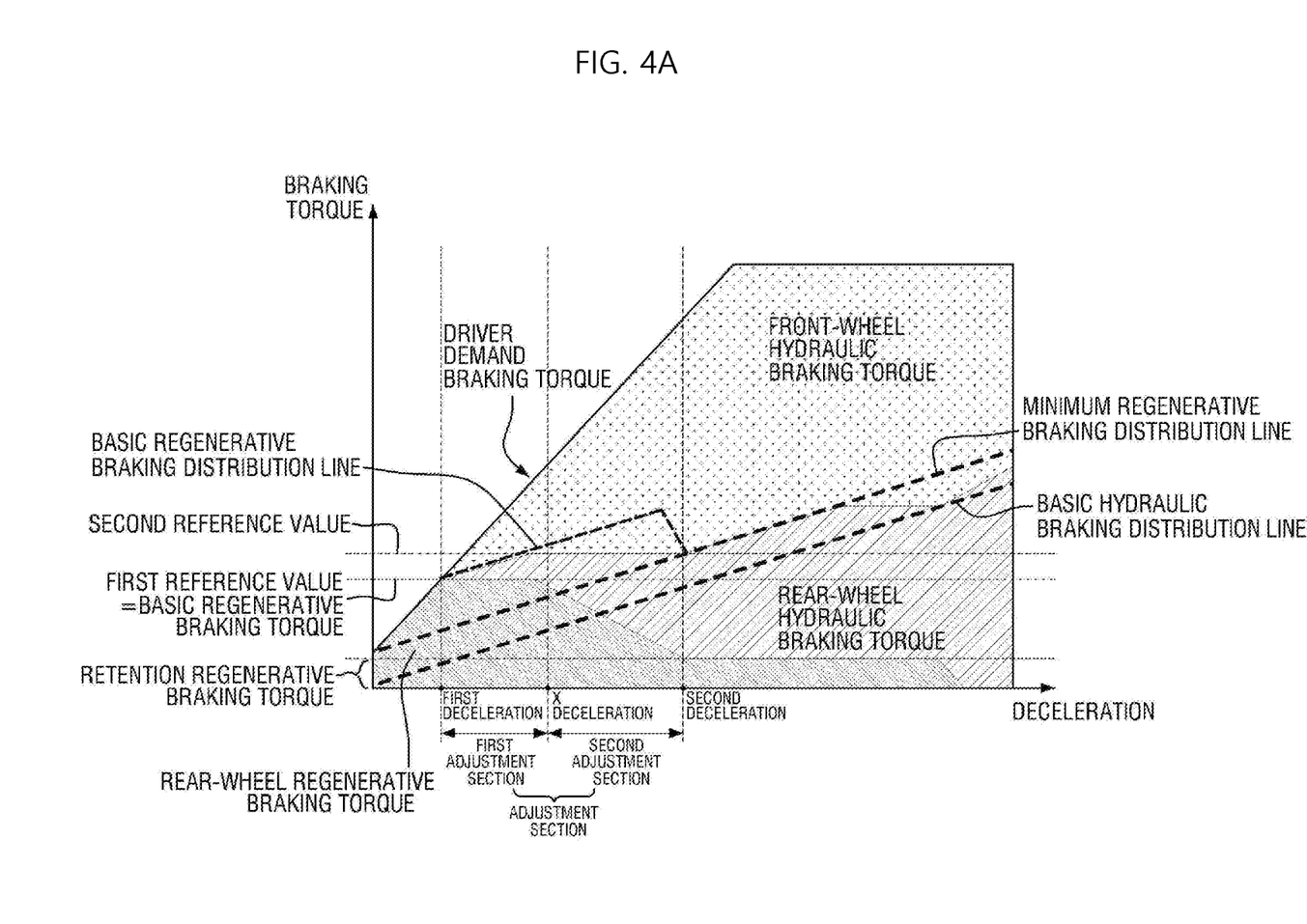
FIG. 4A is a basic regenerative brake map system in accordance with various exemplary embodiments of the present invention.
Figure 4B:
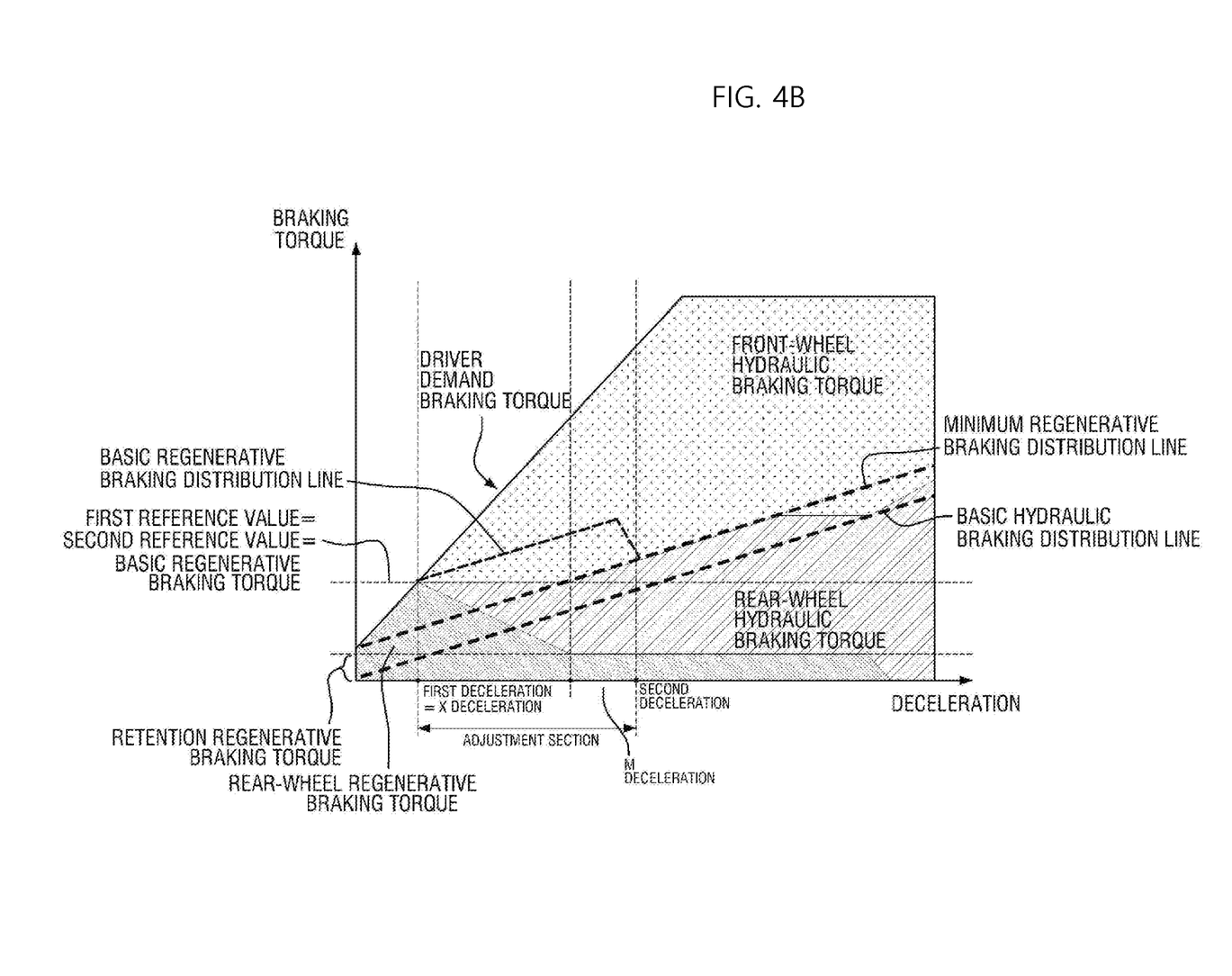
FIG. 4B is a regenerative brake map updated to a stability exemplary mode in FIG. 4A.
Figure 4C:
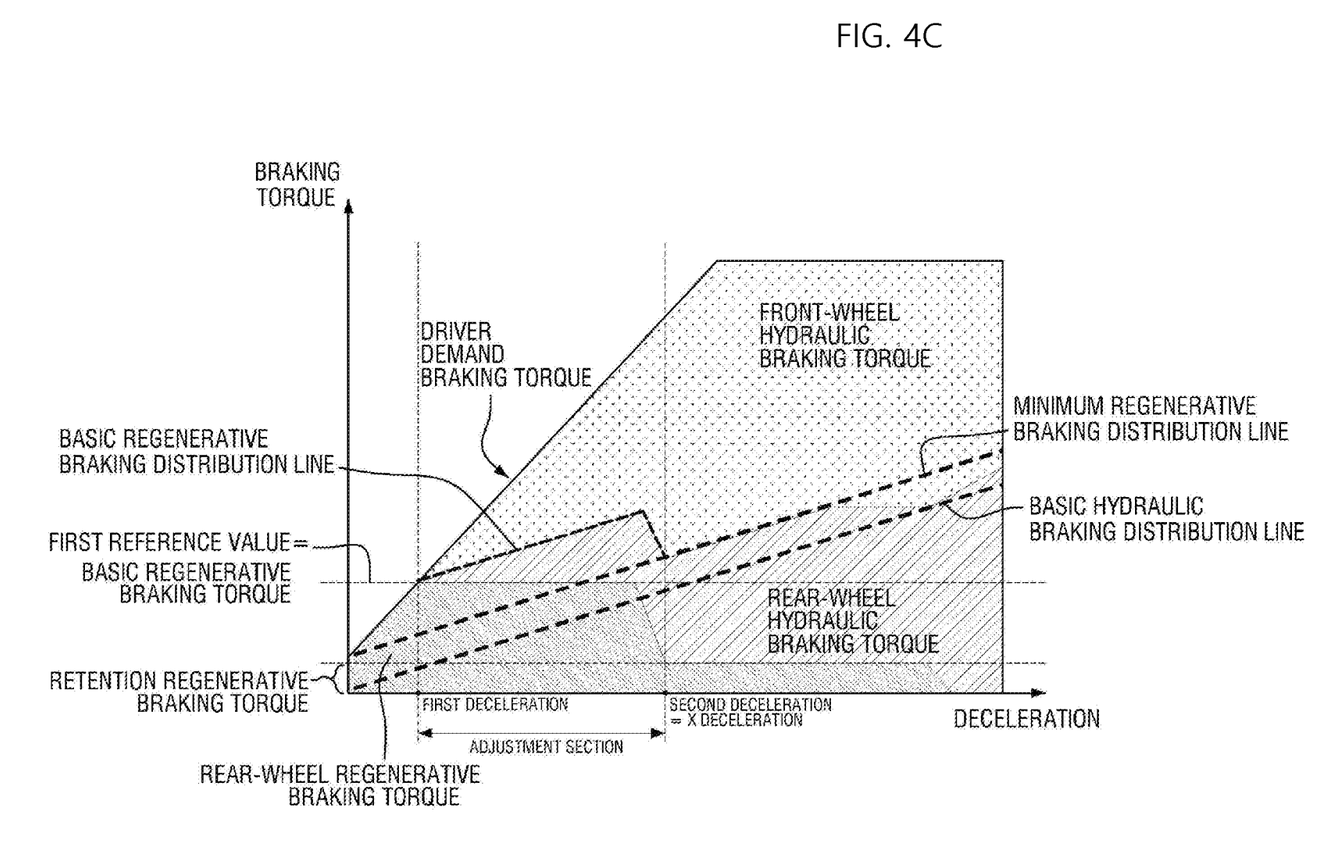
FIG. 4C is a regenerative brake map updated to a fuel-efficiency exemplary mode in FIG. 4A.

FIG. 4A is a basic regenerative brake map system in accordance with various exemplary embodiments of the present invention, FIG. 4B is a regenerative brake map updated to a stability exemplary mode in FIG. 4A, and FIG. 4C is a regenerative brake map updated to a fuel-efficiency exemplary mode in FIG. 4A.

Meanwhile, FIG. 4A corresponds to the regenerative brake map having the second distribution line of FIG. 3B, FIG. 4B corresponds to the regenerative brake map having the first distribution line of FIG. 3B, and FIG. 4C corresponds to the regenerative brake map having the third distribution line of FIG. 3C.

The brake diagrams of FIG. 4A, FIG. 4B and FIG. 4C show a state where the front-wheel braking torque and the rear-wheel braking torque are distributed according to the deceleration level in the total braking torque to satisfy the driver demand braking torque 30.

FIG. 4A is a regenerative brake map set as a basis, in which the X deceleration is positioned in the adjustment section. As illustrated in FIG. 4A, only the rear-wheel regenerative braking torque is generated in the section from the initial braking deceleration to the first deceleration. Here, the rear-wheel regenerative braking torque in the first deceleration is defined as basic regenerative braking torque. The rear-wheel hydraulic braking torque is generated in the first adjustment section, and the rear-wheel regenerative braking torque is formed to be equal to or less than the first reference value. FIG. 4A illustrates an example where the first reference value is equal to the basic regenerative braking torque, and the rear-wheel regenerative braking torque is kept constant at the first reference value in the first adjustment section. In the second adjustment section, the rear-wheel regenerative braking torque is reduced, and simultaneously the rear-wheel hydraulic braking torque is increased, but the rear-wheel braking torque is formed to be equal to or less than the second reference value. The second reference value may be set to be equal to or greater than the first reference value. FIG. 4A illustrates an example where the rear-wheel braking torque is kept constant at the second reference value in the second adjustment section. In the second adjustment section, the rear-wheel regenerative braking torque is reduced until it becomes the retention regenerative braking torque.

FIG. 4B is a regenerative brake map showing a state in which the X deceleration shifts to the first deceleration. The section from the initial braking deceleration to the first deceleration is the same as the operating process of FIG. 4A. However, since the X deceleration is the same as the first deceleration, the operating process such as the first adjustment section of FIG. 4A is not shown in FIG. 4B, and the operating process such as the second adjustment section of FIG. 4A is shown. In the instant case, the first reference value and the second reference value are equal to each other, the rear-wheel regenerative braking torque formed at the first deceleration is reduced, and simultaneously the rear-wheel hydraulic braking torque is increased, but the rear-wheel braking torque is formed to be equal to or less than the second reference value. Here, the rear-wheel braking torque in the adjustment section is at least distributed along the minimum regenerative braking distribution line. In other words, as illustrated in FIG. 4B, the rear-wheel braking torque formed to be equal to or less than the second reference value in the adjustment section is distributed from M deceleration along the minimum regenerative braking distribution line. FIG. 4B may be a brake map that prioritizes the stability of the vehicle because the rear-wheel regenerative braking torque is reduced and the rear-wheel hydraulic braking torque is increased in the adjustment section.

FIG. 4C is a regenerative brake map showing a state in which the X deceleration shifts to the second deceleration. The section from the initial braking deceleration to the first deceleration is the same as the operating process of FIG. 4A. However, since the X deceleration is the same as the second deceleration, the operating process such as the second adjustment process of FIG. 4A is not shown, and the operating process such as the first adjustment process is shown. Therefore, the rear-wheel regenerative braking torque in the adjustment section is formed to be equal to or less than the first reference value, and the rear-wheel hydraulic braking torque increases the basic regenerative braking distribution line to a limit. FIG. 4C may be a brake map that prioritizes the fuel efficiency of the vehicle because the rear-wheel hydraulic braking torque is reduced and the rear-wheel regenerative braking torque is increased in the adjustment section.

In various exemplary embodiments of the present invention, since the first controller 10 distributes the braking torque according to the regenerative brake map in which the rear-wheel regenerative braking torque is previously reduced, it is possible to prevent the rear wheel from slipping. The regenerative-brake-map control may be referred to as a feedforward control.

The first controller 10 may set the brake map of any one of FIG. 4A, FIG. 4B and FIG. 4C as the basic regenerative brake map. The first controller 10 performs a control according to the basic regenerative brake map, updates the brake map in consideration of the stability of the vehicle or the fuel efficiency of the vehicle if the braking situation is changed, and performs a control according to the updated brake map. The braking situation means a situation where the rear wheel may slip depending on road conditions and an inclination during braking of the vehicle. Since there is a high possibility that the rear wheel slips during braking on a low-friction road or a slope, it is necessary to update the brake map to the brake map that prioritizes the stability of the vehicle. Since there is a low possibility that the rear wheel slips during braking on a high-friction road, it is necessary to update the brake map to the brake map that prioritizes the fuel efficiency of the vehicle.

Figure 5:
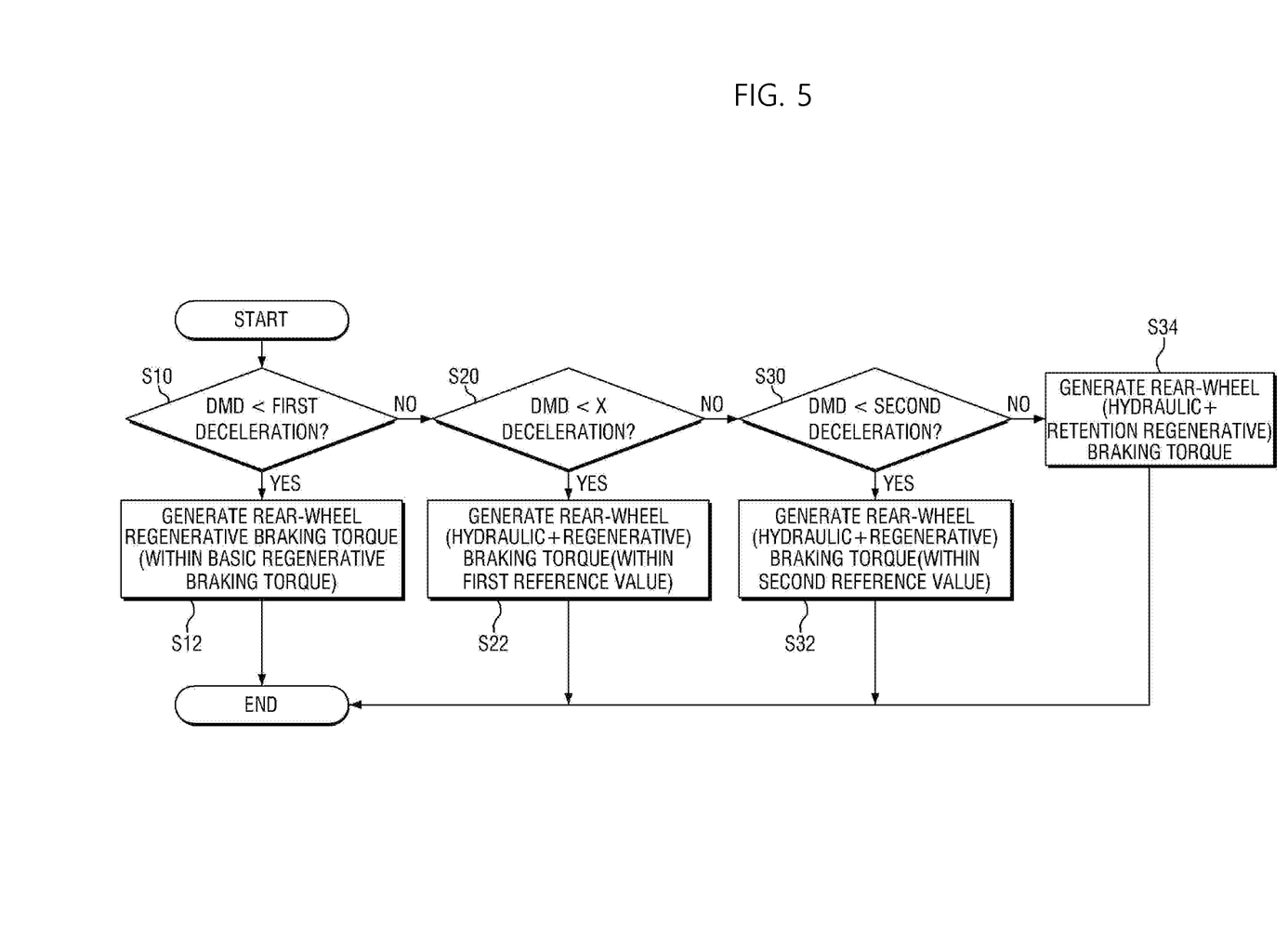
FIG. 5 is a flowchart illustrating a control process of a first controller in accordance with various exemplary embodiments of the present invention.

FIG. 5 is a flowchart illustrating a control process of a first controller in accordance with various exemplary embodiments of the present invention. FIG. 5 illustrates only the control process of the rear-wheel braking torque.

Referring to FIG. 5, the first controller 10 compares driver demand braking deceleration DMD with first deceleration (S10). If the DMD is less than the first deceleration, the first controller 10 controls to generate the rear-wheel regenerative braking torque (including the retention regenerative braking torque) by establishing the basic regenerative braking torque as a limit thereof (S12). If the DMD is greater than the first deceleration, the first controller 10 compares the DMD with the braking torque at the X deceleration (S20). If the DMD is less than the X deceleration, the first controller 10 controls to generate the rear-wheel hydraulic braking torque and the rear-wheel regenerative braking torque (including the retention regenerative braking torque) by establishing the first reference value as a limit thereof (S22). If the DMD is greater than the X deceleration and is less than the second deceleration, the first controller 10 controls such that the sum of the rear-wheel hydraulic braking torque and the rear-wheel regenerative braking torque (including the retention regenerative braking torque) is equal to or less than the second reference value (S32). If the DMD is greater than the second deceleration, a control is performed to generate the rear-wheel hydraulic braking torque and the retention regenerative braking torque (S34).

Turning back to FIG. 2, if the braking force of the rear wheel is large during braking according to the regenerative brake map and thus the wheel slip occurs, the second controller 20 further reduces the rear-wheel regenerative braking torque to secure the stability of the vehicle. In other words, referring to FIG. 4A, if the control of the first controller 10 is performed depending on the rear-wheel regenerative braking torque which is previously reduced in the basic regenerative brake map and the wheel slip occurs during braking of the vehicle, the second controller 20 further reduces the rear-wheel regenerative braking torque.

If the rear-wheel slip value is greater than a predetermined reference slip value according to vehicle driving information 40, the second controller 20 reduces the rear-wheel regenerative braking torque.

The second controller 20 performs a wheel-slip-monitoring based regenerative braking torque reduction control (WBR). After the second controller 20 receives the vehicle driving information 40 and detects whether the wheel slips or not in real time, an operation is performed after the wheel slip occurs. Therefore, the control by the second controller 20 may be a feedback control.

Unless the control is performed according to the regenerative brake map, the rear-wheel braking torque is largely distributed. Thus, the second controller 20 frequently performs interventions to prevent the wheel from slipping, thus leading to different braking feelings. However, in various exemplary embodiments of the present invention, since the control is performed according to the rear-wheel braking distribution map that previously reduces the rear-wheel braking torque, there is a low possibility that the second controller 20 intervenes frequently.

Meanwhile, if the vehicle stability is secured after the rear-wheel regenerative braking torque is further reduced, the second controller 20 increases the rear-wheel regenerative braking torque according to the regenerative brake map which is being controlled.

Figure 6:
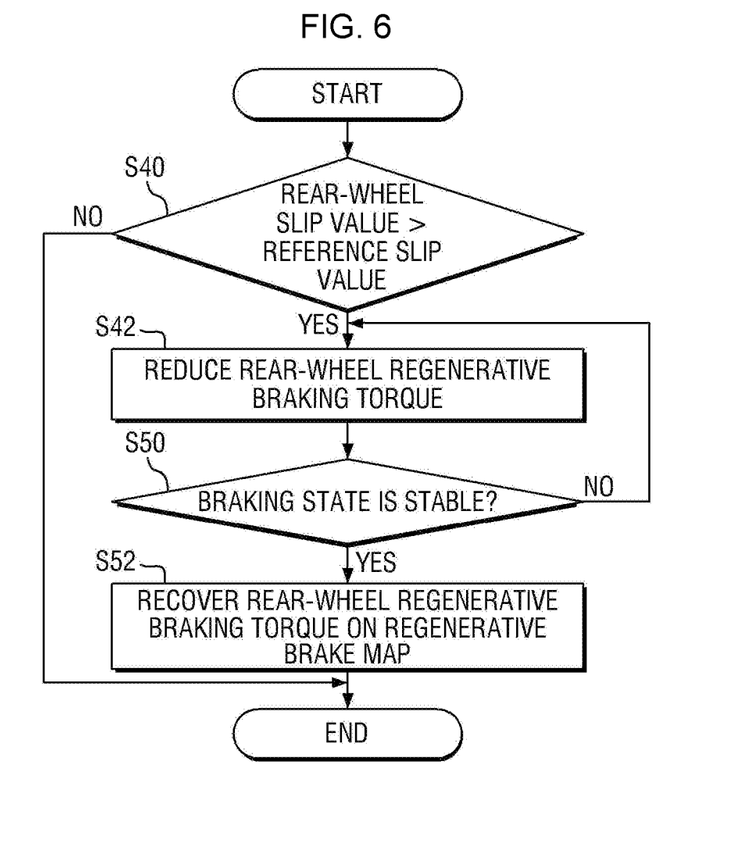
FIG. 6 is a flowchart illustrating a control process of the second controller in accordance with various exemplary embodiments of the present invention.

FIG. 6 is a flowchart illustrating a control process of the second controller in accordance with various exemplary embodiments of the present invention.

Referring to FIG. 6, the second controller 20 compares the rear-wheel slip value with a reference slip value (S40). If the rear-wheel slip value is greater than the reference slip value, the second controller 20 transmits a control signal for reducing the rear-wheel regenerative braking torque to the first controller 10 (S42), and determines whether the braking has recovered to a stable state (S50). Subsequently, if it is determined that the braking has recovered to the stable state, the second controller 20 transmits a control signal for recovering the rear-wheel regenerative braking torque on the regenerative brake map to the first controller 10 (S52). In contrast, if it is determined that the braking is instable, the second controller 20 reduces or maintains the rear-wheel regenerative braking torque until the braking recovers to the stable state.

Turning back to FIG. 2, the first controller 10 and the second controller 20 are connected to a driving system 50 (rear-wheel regenerative braking torque generation system) and a braking system 60 (hydraulic braking torque generation system), and generate a control signal to distribute the braking torque to the front wheel and the rear wheel.

Figure 7:
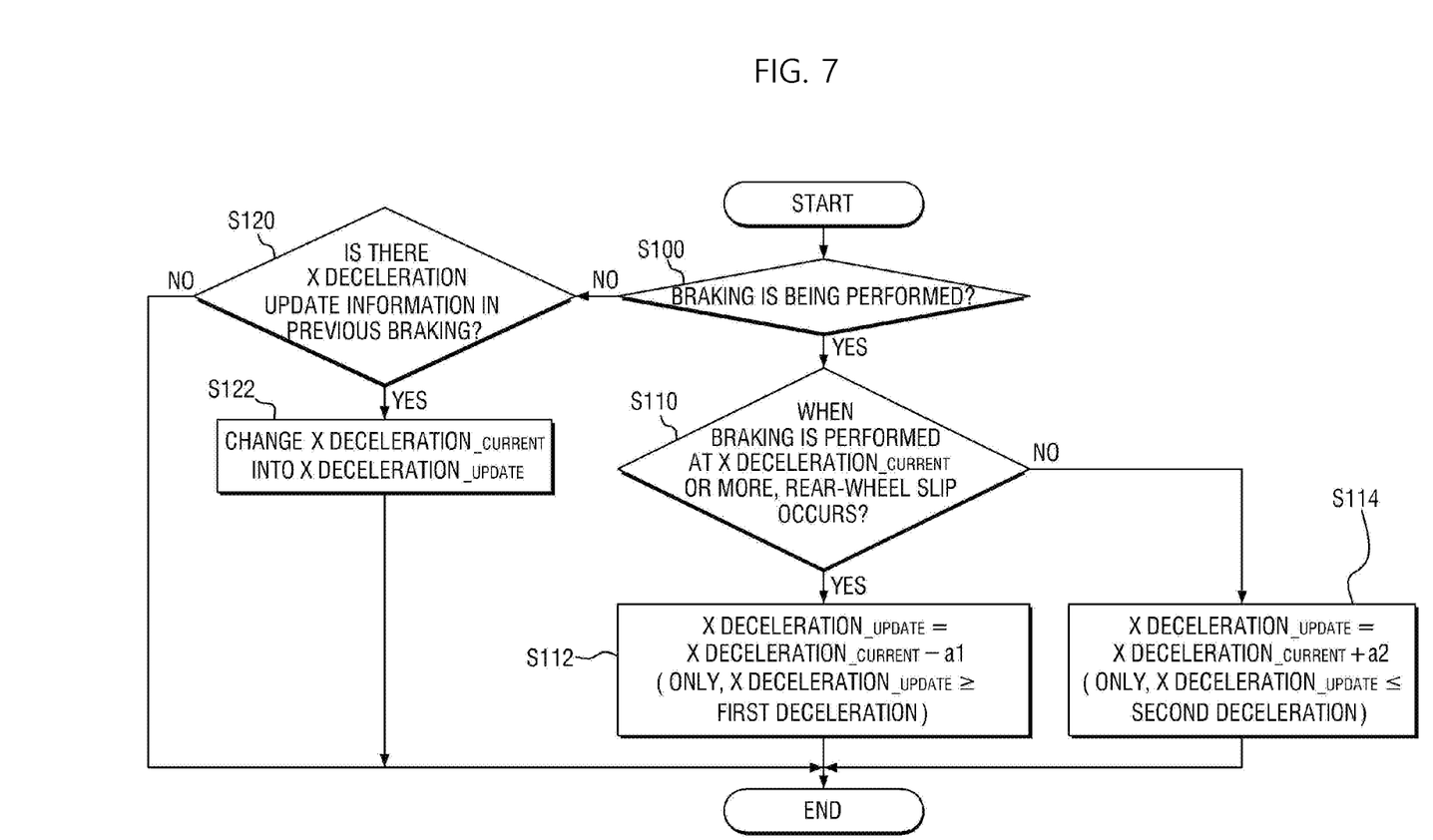
FIG. 7 is a flowchart illustrating a process in which X deceleration is updated, in accordance with various exemplary embodiments of the present invention.
Figure 8:
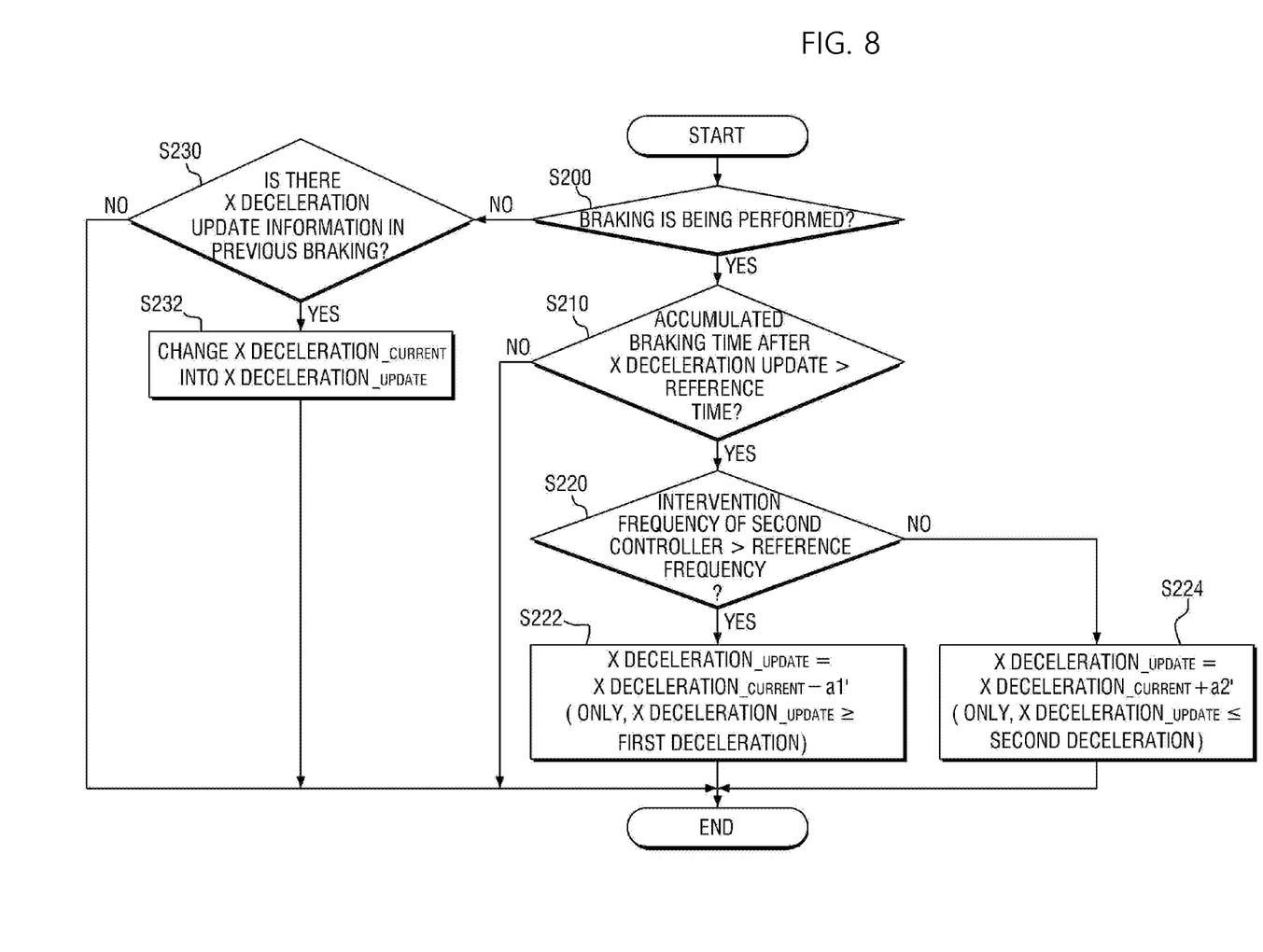
FIG. 8 is a flowchart illustrating a process in which X deceleration is updated, in accordance with various exemplary embodiments of the present invention.

FIG. 7 is a flowchart illustrating a process in which X deceleration is updated, in accordance with various exemplary embodiments of the present invention, and FIG. 8 is a flowchart illustrating a process in which X deceleration is updated, in accordance with various exemplary embodiments of the present invention. Meanwhile, in FIGS. 7 and 8, X deceleration before update is expressed as X deceleration_CURRENT, and X deceleration after update is expressed as X deceleration_UPDATE.

As described above, a case where the regenerative brake map is updated is a case where a braking situation is changed during braking of the vehicle. This may be determined according to the intervention degree of the second controller 20. For example, if the intervention degree of the second controller 20 is large, it is necessary to update the map to the regenerative brake map (see FIG. 4B) suitable for the vehicle stability. If there is no intervention of the second controller 20, it is necessary to update the map to the regenerative brake map (see FIG. 4C) suitable for improving the vehicle fuel efficiency. The regenerative brake map is updated while the position of the X deceleration is changed in the adjustment section.

Here, unless the rear wheel slips when braking is performed at X deceleration or more, there is no problem in vehicle stability, so that it is necessary to increase the X deceleration to improve the vehicle fuel efficiency. In contrast, if rear wheel slips, it is necessary to reduce the X deceleration to secure the vehicle stability.

Referring to FIG. 7, the first controller 10 first determines whether braking of the vehicle is being performed (S100). When the braking is being performed, if the rear wheel slips in a situation where the driver demand braking deceleration is equal to or greater than X deceleration_CURRENT (this may be determined by the intervention of the second controller 20), the first controller 10 reduces the X deceleration_CURRENT by the deceleration of a1 and then updates it to the X deceleration_UPDATE (S112). However, the X deceleration_UPDATE may not be updated to be less than the first deceleration. In contrast, unless the rear wheel slips in a situation where the driver demand braking deceleration is equal to or greater than the X deceleration_CURRENT, the first controller 10 increases the X deceleration_CURRENT by the deceleration of a2 to update it to the X deceleration_UPDATE (S114). However, the X deceleration_UPDATE may not be updated to be greater than the second deceleration.

When the braking is not performed, it is determined whether there is information related to X-deceleration update in a previous braking operation (S120). If there is the information related to the X-deceleration update, the first controller 10 updates the X deceleration_CURRENT to the X deceleration_UPDATE (S122). Of course, the X deceleration_CURRENT exists between the first deceleration and the second deceleration.

According to various exemplary embodiments of the present invention, the second controller 20 monitors whether the rear wheel slips or not in real time, and the first controller 10 updates the X deceleration according to the intervention degree of the second controller 20 and then applies it to the regenerative brake map in a subsequent braking operation.

As described above, in various exemplary embodiments of the present invention, the second controller 20 monitors the rear-wheel slip in real time and then transmits it to the first controller 10, and the first controller 10 updates the X deceleration in the subsequent braking operation. However, according to various exemplary embodiments of the present invention, the first controller 10 updates the X deceleration when a predetermined time period has passed after the intervention degree of the second controller 20 is verified for a predetermined time period (accumulated braking time) when braking is performed.

Referring to FIG. 8, first, the first controller 10 determines whether braking of the vehicle is being performed (S200). When the braking is being performed, the first controller 10 determines whether the accumulated braking time is greater than a predetermined reference time after the previous update of the X deceleration (S210). If the accumulated braking time is less than the reference time, it is determined that a sufficient braking time is not accumulated to update the X deceleration, thus further obtaining a braking time. In contrast, if the accumulated braking time is greater than the reference time, the first controller 10 determines whether the intervention frequency of the second controller 20 is greater than a predetermined reference frequency (S220). If the intervention frequency of the second controller 20 is greater than the predetermined reference frequency, the first controller 10 reduces the X deceleration_CURRENT by deceleration of a1' to update it to the X deceleration_UPDATE (S222). However, the X deceleration_UPDATE may not be updated to be less than the first deceleration. If the intervention frequency of the second controller 20 is less than the reference frequency, the first controller 10 increases the X deceleration_CURRENT by deceleration of a2' to update it to the X deceleration_UPDATE (S224). However, the X deceleration_UPDATE may not be updated to be greater than the second deceleration. Here, the intervention frequency of the second controller 20 may be determined by the intervention time of the second controller 20 relative to the braking time, and the reference frequency, the a1' deceleration, and the a2' deceleration are preset so that there is no different feeling of the vehicle.

Meanwhile, since the case where the braking operation is not performed in S230 and S232 of FIG. 8 is the same as that of FIG. 7, a duplicated description thereof will be omitted herein.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for preventing instability of a vehicle due to regenerative braking of a rear wheel of the vehicle, the system comprising:
a first controller configured of distributing braking torque of a front wheel and the rear wheel of the vehicle for a deceleration level according to a basic regenerative braking distribution ratio on a regenerative brake map on a basis of a driver demand braking amount, and configured of previously reducing a rear-wheel regenerative braking torque of the rear wheel to a first reference value or less than the first reference value in an adjustment section between a first deceleration and a second deceleration; and
a second controller connected to the first controller and configured of further reducing the rear-wheel regenerative braking torque to transmit a control signal of the reduced rear-wheel regenerative braking torque to the first controller, upon determining that a rear-wheel slip value generated in the rear wheel is greater than a reference slip value according to vehicle driving information during braking of the vehicle,
wherein the first controller is configured to adjust the rear-wheel regenerative braking torque of the adjustment section or a rear-wheel hydraulic braking torque depending on an intervention degree of the second controller, thus updating the regenerative brake map.

2. The system of claim 1, wherein the first deceleration is set considering that regenerative braking torque is distributed on the rear wheel before the rear-wheel hydraulic braking torque intervenes.

3. The system of claim 1, wherein the second deceleration is set in consideration of a state where the rear-wheel regenerative braking torque is eliminated, except for a predetermined retention regenerative braking torque to prevent the rear wheel from previously locking.

4. The system of claim 1, wherein the first controller is configured to control to increase the rear-wheel hydraulic braking torque in a section between the first deceleration and an X deceleration among the adjustment section.

5. The system of claim 4, wherein the first controller is configured to reduce the rear-wheel regenerative braking torque in a section between the X deceleration and the second deceleration, to increase the rear-wheel hydraulic braking torque, and to control so that the rear-wheel braking torque is equal to or less than a second reference value.

6. The system of claim 5, wherein the first controller is configured to monitor whether the second controller intervenes in a real time to adjust the X deceleration.

7. The system of claim 5, wherein the first controller is configured to adjust the X deceleration in consideration of an intervention frequency of the second controller which is collected for a predetermined braking time.

8. The system of claim 1, wherein the first controller is configured to control so that the rear-wheel braking torque in the adjustment section is distributed according to a minimum regenerative braking distribution on the regenerative brake map.

9. The system of claim 1, wherein the second controller is configured to control to recover the regenerative braking torque of the rear wheel according to the basic regenerative braking distribution ratio upon determining that a vehicle stability is secured after the rear-wheel regenerative braking torque is further reduced.

10. A method of controlling a system for preventing instability of a vehicle due to regenerative braking of a rear wheel of the vehicle, the system having a first controller and a second controller connected to the first controller, the method comprising:
distributing, by the first controller, braking torque of a front wheel and the rear wheel of the vehicle for a deceleration level according to a basic regenerative braking distribution ratio on a regenerative brake map on a basis of a driver demand braking amount (DMD), and previously reducing a rear-wheel regenerative braking torque of the rear wheel to a first reference value or less than the first reference value in an adjustment section between a first deceleration and a second deceleration; and
further reducing, by the second controller, the rear-wheel regenerative braking torque to transmit a control signal of the reduced rear-wheel regenerative braking torque to the first controller, upon determining that a rear-wheel slip value generated in the rear wheel is greater than a reference slip value according to vehicle driving information during braking of the vehicle.

11. The method of claim 10, further including:
comparing, by the first controller, the DMD with the first deceleration; and
when the DMD is less than the first deceleration, generating, by the first controller, the rear-wheel regenerative braking torque by establishing the basic regenerative braking torque as a limit thereof.

12. The method of claim 11, wherein when the DMD is greater than the first deceleration, comparing, by the first controller, the DMD with a braking torque at an X deceleration; and wherein when the DMD is less than the X deceleration, generating, by the first controller, a rear-wheel hydraulic braking torque and the rear-wheel regenerative braking torque by establishing the first reference value as a limit thereof.

13. The method of claim 12,
wherein, when the DMD is greater than the X deceleration and is less than the second deceleration, controlling, by the first controller for a sum of the rear-wheel hydraulic braking torque and the rear-wheel regenerative braking torque to be is equal to or less than a second reference value; and
wherein when the DMD is greater than the second deceleration, generating, by the first controller, the rear-wheel hydraulic braking torque and the retention regenerative braking torque.

14. The method of claim 10, further including: comparing, by the second controller, the rear-wheel slip value with a reference slip value; when the rear-wheel slip value is greater than the reference slip value, transmitting, by the second controller, a control signal for reducing the rear-wheel regenerative braking torque to the first controller, and determining whether the braking has recovered to a stable state; and when the second controller concludes that the braking has recovered to the stable state, transmitting, by the second controller, a control signal for recovering the rear-wheel regenerative braking torque on the regenerative brake map to the first controller.

15. The method of claim 14, wherein when the second controller concludes that the braking is instable, reducing or maintaining, by the second controller, the rear-wheel regenerative braking torque until the braking recovers to the stable state.

16. The method of claim 10, further including:
determining, by the first controller, whether braking of the vehicle is being performed; and
when the braking is being performed and the rear wheel slips in a situation where the DMD is equal to or greater than X deceleration, reducing, by the first controller, the X deceleration by a predetermined deceleration and then updating the X deceleration to be less than the first deceleration.

17. The method of claim 16, wherein unless the rear wheel slips in a situation where the DMD is equal to or greater than the X deceleration, increasing, by the first controller, the X deceleration by a predetermined deceleration to update the X deceleration to be equal to or lower than the second deceleration.

18. The method of claim 10, further including:
determining, by the first controller, whether the braking of the vehicle is being performed;
when the braking is being performed, determining, by the first controller, whether an accumulated braking time is greater than a predetermined reference time;
when the accumulated braking time is greater than the predetermined reference time, determining, by the first controller, whether an intervention frequency of the second controller is greater than a predetermined reference frequency; and
when the intervention frequency of the second controller is greater than the predetermined reference frequency, reducing, by the first controller, the X deceleration by a predetermined deceleration to update the X deceleration to be equal to or greater than the first deceleration.

19. The method of claim 18, wherein when the intervention frequency of the second controller is less than the predetermined reference frequency, the first controller is configured to increase the X deceleration by a predetermined deceleration to update the X deceleration to be equal to or less than the second deceleration.

* * * * *